(12) United States Patent
Holopainen et al.

(10) Patent No.: US 7,812,494 B2
(45) Date of Patent: Oct. 12, 2010

(54) SUPPORT IN A STATOR

(75) Inventors: Timo Holopainen, Espoo (FI); Janne Roivainen, Tuusula (FI); Ingmar Waltzer, Helsinki (FI); Juha Hellsten, Espoo (FI)

(73) Assignee: ABB Oy, Helsinki (FI)

( * ) Notice: Subject to any disclaimer, the term of this patent is extended or adjusted under 35 U.S.C. 154(b) by 498 days.

(21) Appl. No.: 11/883,788

(22) PCT Filed: Feb. 16, 2006

(86) PCT No.: PCT/FI2006/000055

§ 371 (c)(1),
(2), (4) Date: Aug. 7, 2007

(87) PCT Pub. No.: WO2006/087418

PCT Pub. Date: Aug. 24, 2006

(65) Prior Publication Data
US 2008/0157624 A1    Jul. 3, 2008

(30) Foreign Application Priority Data
Feb. 17, 2005   (FI)   ................................. 20050186

(51) Int. Cl.
*H02K 5/00* (2006.01)
(52) U.S. Cl. ......................................... 310/91; 310/89
(58) Field of Classification Search .................. 310/89, 310/91
See application file for complete search history.

(56) References Cited

U.S. PATENT DOCUMENTS

| 3,988,622 | A | * | 10/1976 | Starcevic | 310/91 |
|---|---|---|---|---|---|
| 4,012,653 | A | | 3/1977 | Shigeta et al. | |
| 4,207,484 | A | * | 6/1980 | Krecker | 310/91 |
| 4,249,097 | A | | 2/1981 | Gronholm | |
| 4,450,373 | A | | 5/1984 | Miller et al. | |
| 4,469,973 | A | | 9/1984 | Guyot et al. | |
| 4,564,779 | A | * | 1/1986 | Terry, Jr. | 310/433 |

(Continued)

FOREIGN PATENT DOCUMENTS

JP    54-162107 A    12/1979

(Continued)

OTHER PUBLICATIONS

International Search Report for PCT/FI2006/000055, dated Oct. 5, 2006.

*Primary Examiner*—Nguyen N Hanh
(74) *Attorney, Agent, or Firm*—Buchanan Ingersoll & Rooney PC

(57) ABSTRACT

The invention comprises an electrical machine with a stator (10) formed of plates, said stator (10) having an outer surface (11) and a first and second end (12) in the axial direction (2) and said stator being supported on the frame (1) of the electrical machine. The stator (10) is supported by necks of material (40*a-d*) on the outer surface (11) at both ends of the stator. The number of necks (40*a-d*) at both ends of the stator is even. The stator (10) has a vertical symmetry axis (7) perpendicular to the axial direction (2) and a horizontal symmetry axis (8) perpendicular to the axial direction (2), and the necks (21*a-f*, 31*a-d*, 40*a-d*) are located symmetrically in relation to at least one of the symmetry axes (7, 8).

12 Claims, 7 Drawing Sheets

U.S. PATENT DOCUMENTS 4,975,613 A * 12/1990 Brem et al. .................. 310/419
6,628,027 B2 * 9/2003 Fuller .......................... 310/91

FOREIGN PATENT DOCUMENTS

| | | |
|---|---|---|
| JP | 5-30689 A | 2/1993 |
| JP | 5-219682 A | 8/1993 |
| JP | 06-311685 A | 11/1994 |
| JP | 7-163085 A | 6/1995 |
| JP | 9-322469 A | 12/1997 |
| JP | 11-089195 A | 3/1999 |
| JP | 2000-37069 A | 2/2000 |
| JP | 2002-281698 A | 9/2002 |
| SU | 1234916 A1 | 1/1984 |

* cited by examiner

SUPPORT IN A STATOR

BACKGROUND (1) Field

An object of an exemplary embodiment of the invention is an arrangement for supporting the stator of an electrical machine.

(2) Description of Related Art

The object of the invention is an arrangement for supporting the stator of an electrical machine according to the preamble part of claim 1.

The fundamental wave of magnetic flux creates a rotating force field in the air gap of an electrical machine, between the rotor and the stator. The spatial wavelength of this harmonic force field is 360/2 p degrees, in which p is the number of pairs of poles. The rotating force wave is a required part of electrical machine operation and cannot be substantially reduced. On the other hand, the amplitude of the force wave is so great that even a thick stator back tends to deform. This happens in spite of the fact that the elastic properties of the stator pack in a plane perpendicular to the shaft are close to the corresponding values for steel. On the other hand, the deformations of the stator have a quasi-static nature because the frequency of the characteristic form corresponding to the force wave, for example 400 Hz, is clearly higher than the excitation frequency, for example 100 Hz. The excitation frequency is the supply frequency multiplied by two.

The frame structure of large electrical machines is usually box-shaped. The frame structure is usually relatively symmetric in relation to the vertical plane containing the axial line and the sectional plane perpendicular to the axial line going through the centre point. However, the motor is usually asymmetric in relation to the horizontal plane containing the axial line. In such a structure the rotating deformation wave present in the stator creates vibration in the frame structure due to the asymmetry of the structure and support. These deformations are manifested as bearing vibration, for example.

The stator usually comprises thin plates that are attached together using back beams and welding, for example. The outermost part of the stator forms the stator back, and there are grooves in the internal part of the stator in which the windings are placed. Stator deformation can be reduced by making the stator back thicker or by using external reinforcements to stiffen the stator. However, this will increase the number of stages of manufacture, the manufacturing costs, the weight of the machine and its space requirement.

Another method of solving the problem is isolating the stator from the frame. The objective of isolation is to reduce the transmission of stator deformations to the frame and the subsequent emergence of bearing vibration. A common method for the construction of machines is to suspend the source of vibration in a flexible manner. In the case of a stator, this is impeded by the fact that the stator support must be able to bear quasi-static and dynamic loads in various situations. Such loads include gravitational force, nominal torque and short circuit torque. Furthermore, the stator pack and its suspension have a substantial effect on the characteristic frequencies and vibration behaviour of the entire motor.

The vibration problem at the second multiple of the supply frequency is particularly substantial in large two-pole asynchronous machines. Higher numbers of poles shorten the spatial wavelength of the force field, which reduces the deformations of the stator.

SUMMARY

A purpose of an exemplary embodiment of the present invention is to create an arrangement for reducing frame and bearing vibrations in an electrical machine in a manner that is advantageous in terms of manufacturing technique.

According to an exemplary embodiment of the invention, the stator is supported and fastened at the ends of the stator pack. Support is implemented by means of in the circumferential direction narrow necks of material on the outer circumference of the stator having the smallest possible circumferential width. The length of necks to the axial direction of the stator is short in comparison to the length of the stator in the axial direction. The number of the necks at the end of the stator pack is even. The stator has a vertical symmetry axis perpendicular to the axial direction and a horizontal symmetry axis perpendicular to the axial direction. The necks of material are located symmetrically to at least one of the symmetry axes, or the necks may be located symmetrically to both symmetry axes. In a preferred solution the necks are located close to the vertical axis perpendicular to the axial direction and the horizontal axis perpendicular to the axial direction. The support isolates the stator from the frame by utilising the natural properties of the frame structure. Furthermore, the support eliminates the transmission of the rotating stator deformation wave into horizontal vibration of the frame.

A particularly preferred solution includes four necks of material at the end of the stator pack, with the necks located on the vertical axis perpendicular to the axial direction and on the horizontal axis perpendicular to the axial direction.

The intention does not aim to prevent elliptical movement caused by the force field. In the solution according to an exemplary embodiment of the invention, only a small amount of vibration energy is transmitted from the stator to the frame of the machine due to a symmetric and flexible attachment.

The solution according to an exemplary embodiment of the invention substantially reduces the frame and bearing vibrations caused by the fundamental flux of electrical machines. The invention particularly improves the management of second-order vibrations in large two-pole electrical machines. The invention can also be used to reduce higher-frequency impulses originating in the stator from being transmitted to the frame and becoming audible. The solution according to exemplary embodiments of the invention is not limited to two-pole machines; it is also suitable for asynchronous or synchronous machines with more poles.

A support arrangement with four necks of material is preferred in terms of manufacturing technique. A particularly preferred solution can be achieved by implementing an attachment of four necks of material between the stator end plate and the intermediate wall. Either of the surfaces, which have originally been machined to a round shape, can be made thinner between the necks. The required reduction in thickness is small, for example 0.1 to 2 mm. This does not have any substantial effect on structural rigidity. In particular, rigidity in the cross direction of the intermediate walls remains unchanged. Furthermore, the narrow slot does not cause any substantial through flow of cooling air that would require the slot to be blocked. In a solution according to the invention, positioning the stator is simple as the attachment surfaces are concentric. The circumferential width and the length in axial direction of the neck are determined from the ultimate load transmitted from the stator to the frame of electrical machine. A suitable circumferential width of the neck seen from the centre of the stator to the circumference is 4° . . . 20°, preferably 5° . . . 10°. In an embodiment, where the necks are formed on an intermediate wall, it is preferred in terms of manufacturing technique to dimension of the length of the neck to axial direction equal to the thickness of the intermediate wall. In an embodiment, where the necks are elements attached to an intermediate wall or an end plate, it is efficient to dimension the necks to be longer than the thickness of the intermediate wall; the length of a neck is 1 . . . 6 times the thickness of the intermediate wall or and-plate, for instance.

The structure presented in an exemplary embodiment of the invention is preferable in terms of quasi-static loads. When the necks of material are located close to the vertical axis perpendicular to the axial direction and the horizontal axis perpendicular to the axial direction, they are also close to the side walls, bottom plate and top plate of the frame. As a consequence of this, the support of the attachment points is rigid at the planes of these plates. When the stator is supported at both ends with four narrow necks of material, it can be generalised that the stator is supported at eight axially rigid points and four vertically and horizontally rigid points. All of the eight attachment points are inherently flexible in the radial direction. If necessary, the attachment can be further improved locally by reinforcing the inherently rigid directions of the support points specified above. Rigidity in the radial direction can also be reduced. A particularly preferred solution in the radial direction is a radially flexible support to a frame that is as rigid as possible in the radial direction.

When the solution according to an exemplary embodiment of the invention is implemented by two necks of material at the end of the stator pack, it is preferable to locate the necks at the intersection points of the horizontal axis perpendicular to the axial direction, the outer surface of the stator and the ends of the stator. In this case the necks are located symmetrically in relation to the vertical symmetry axis perpendicular to the axial direction.

In a solution implemented with six necks of material, it is preferable to locate two necks either at the intersection points of the horizontal axis perpendicular to the axial direction, the outer surface of the stator and the ends of the stator, or at the intersection points of the vertical axis perpendicular to the axial direction, the outer surface of the stator and the ends of the stator. The remaining four necks are located at the intersection points of the outer surface of the stator and the ends of the stator so that all six necks are symmetrical to each other.

In a solution with eight necks it is most preferable to locate four necks at the intersection points of the horizontal axis perpendicular to the axial direction, the outer surface of the stator and the ends of the stator so that the necks are located close to each other at both sides of the intersection points. The remaining four necks are located at the intersection points of the vertical axis perpendicular to the axial direction, the outer surface of the stator and the ends of the stator so that the necks are located close to each other at both sides of the intersection points. In this case the necks are located symmetrically in relation to the vertical symmetry axis perpendicular to the axial direction and the horizontal symmetry axis perpendicular to the axial direction.

The structure presented in an exemplary embodiment of the invention receives the load imposed by torque on the stator by means of the necks and transfers the load to the base through the top plate, side walls, bottom plate and the frame mounts.

In the following exemplary embodiments of the invention will be described in more detail with the help of certain embodiments by referring to the enclosed drawings.

DETAILED DESCRIPTION

Figure 1:
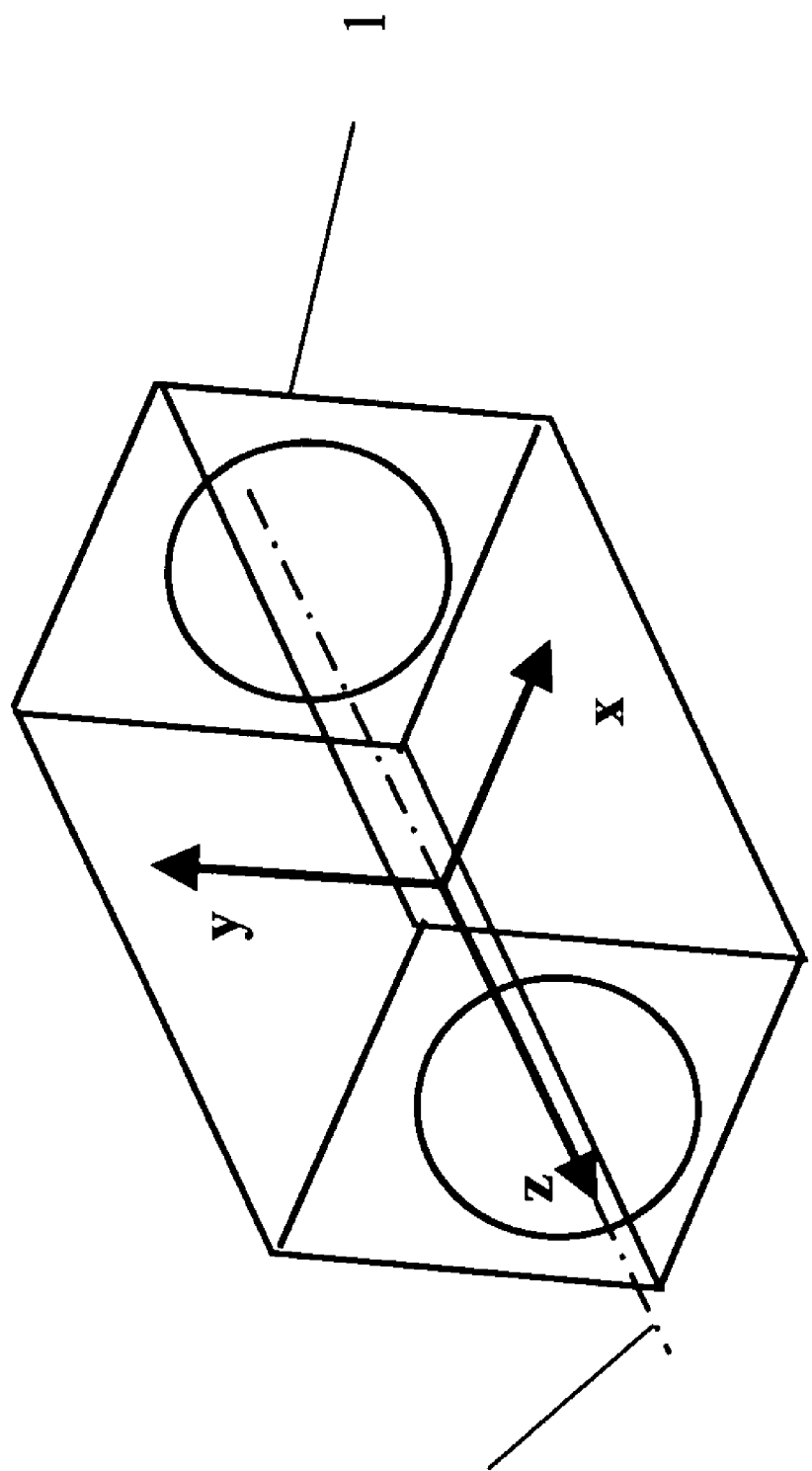
FIG. 1. Frame structure and coordinate system
FIG. 2. Frame deformations, prior art
FIG. 3. Frame deformations
FIG. 4. Stator support, side view
FIG. 5. Support on intermediate wall
FIG. 6. Support on thrust ring
FIG. 7. Support with separate support members

The frame structure 1 of an electrical machine and the applicable coordinate system (xyz) are illustrated in FIG. 1. The frame is assumed to be a box. The frame structure is relatively symmetric in relation to the vertical plane containing the axial line 2 (the yz plane), as well as the sectional plane perpendicular to the axial line 2 containing the centre point (the xy plane). The motor and its support are asymmetric in relation to the horizontal plane containing the axial line 2 (the xz plane).

Figure 2:
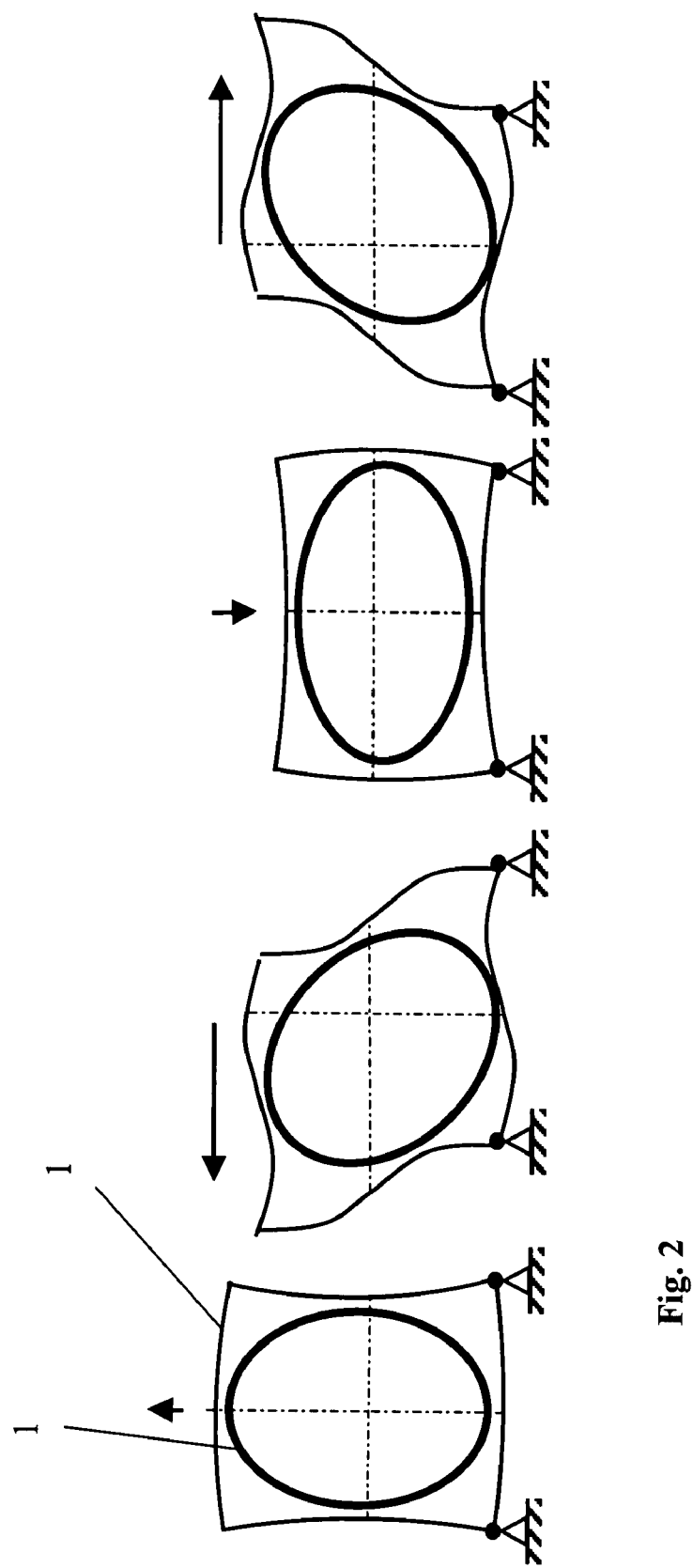

In a two-pole electrical machine a force field deforms the stator and makes it elliptical. FIG. 2 illustrates deformations imposed by a rotating elliptical wave on the frame 1 according to prior art. Simply said, the rotating stator deformation ellipse bends the frame 1 into a diamond shape and causes horizontal net movement of the centre of gravity.

Figure 3:
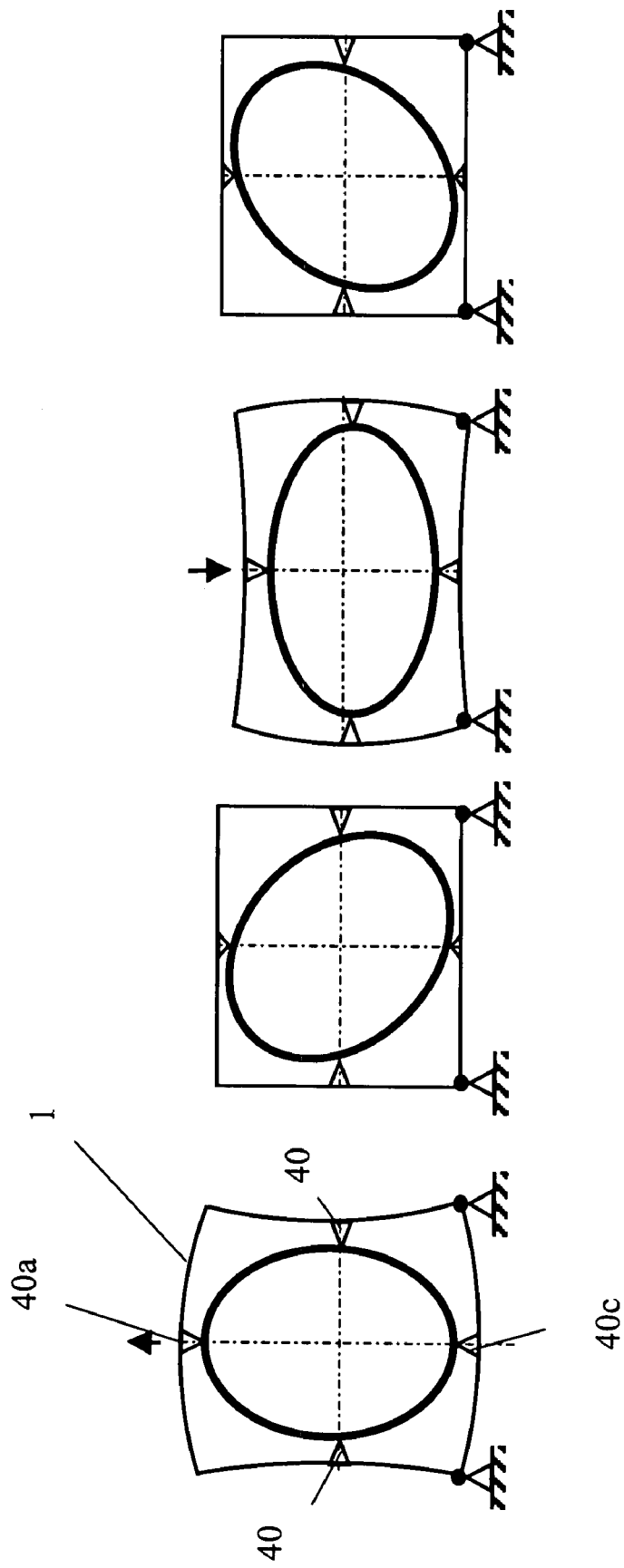

FIG. 3 illustrates frame deformations with a support according to an exemplary embodiment of the invention. The number of necks 40a-d is four. The intention does not aim to prevent elliptical deformation of the stator pack caused by the force field. In a solution according to an exemplary embodiment of the invention, only a small amount of vibration energy is transmitted from the stator to the frame 1 of the machine due to a symmetric and flexible attachment. This means that the rotating deformation wave is not transmitted into horizontal vibration of the frame 1.

FIGS. 2 and 3 emphasise the frame deformations caused by the force field.

Figure 4:
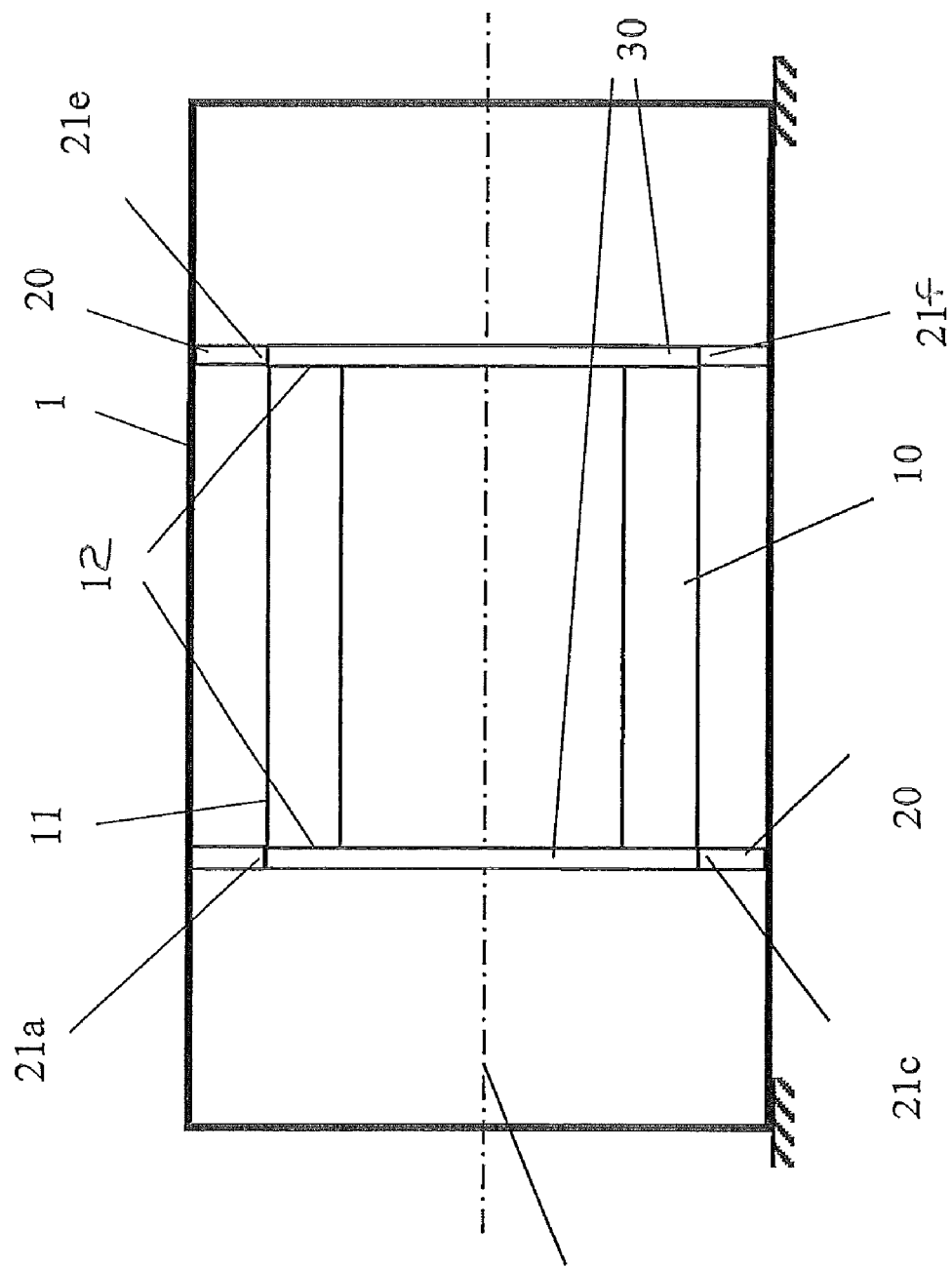

An exemplary embodiment of the invention is illustrated in FIG. 4. In FIG. 4 the stator 10 is located inside the frame 1 of the machine. The stator 10 is supported at both ends 12 of the stator at the locations of the thrust rings 30 and intermediate walls 20 using narrow necks of material 21a, 21c, 21e, 21f (the remaining four necks are not visible in the illustration). The intermediate walls 20 are supported on the frame 1. The concentrically machined necks position the stator 10 radially in relation to the frame 1. The necks 21a, 21c, 21e, 21f are a part of the intermediate wall 20. Controlled contact between the stator 10 and the intermediate walls 20 of the frame can be created by a crimp or shrink fit, for example.

Figure 5:
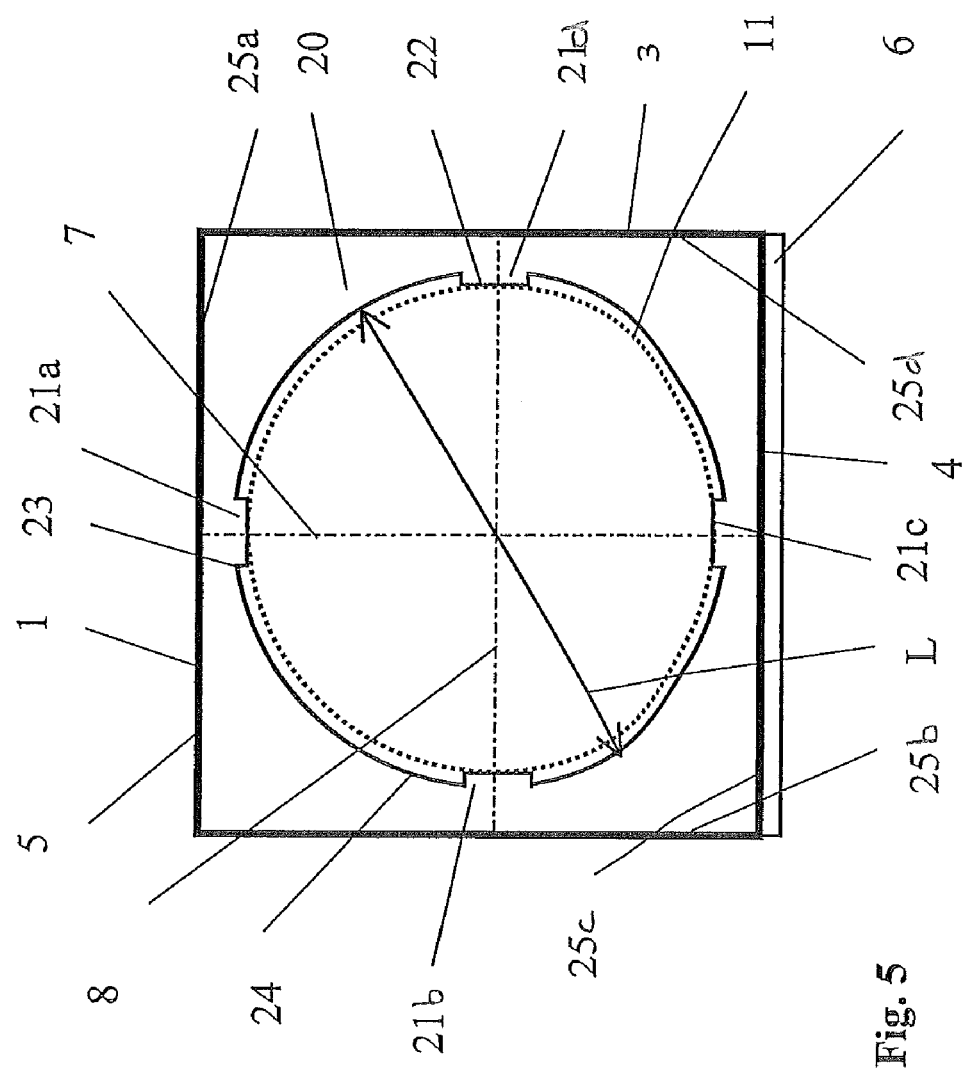

The exemplary embodiment presented in FIG. 5 the square intermediate wall 20 has a round opening 24 in the middle, with four necks 21a, 21b, 21c, 21d supporting the stator on the inner surface of the opening. The necks are of substantially equal size and shape. The first neck 21a is located at the midpoint of the side 25a of the intermediate wall, the second neck 21b is at the midpoint of the side 25b, the third neck 21c is at the midpoint of the side 25c and the fourth neck 21d is at the midpoint of the side 25d. These locations of the necks 21a-d place them close to the side walls 3, bottom plate 4 and top plate 5 of the frame. Thus the support of the necks 21 a-d is rigid in the planes of these plates. The torque is transmitted through the necks 21a-d, the intermediate wall 20, the top plate 5, the bottom plate 4, the side walls 3 and the frame mounts to the base 6. The outer surface 11 is marked with a broken line in the drawing.

The side length or protrusion 23 of the neck, for example 0.5 mm, is very small compared with the diameter L of the opening 24, for example 1000 mm. The width of the base 22 of the neck, 80 mm, is small compared with the diameter L of the opening 24, for example 1000 mm. The length of the neck in axial direction is the same as the thickness of the intermediate wall, 20 . . . 40 mm for instance.

The necks are located symmetrically in relation to the vertical symmetry axis 7 perpendicular to the axial direction. The necks are also located symmetrically in relation to the horizontal symmetry axis 8 perpendicular to the axial direction.

Figure 6:
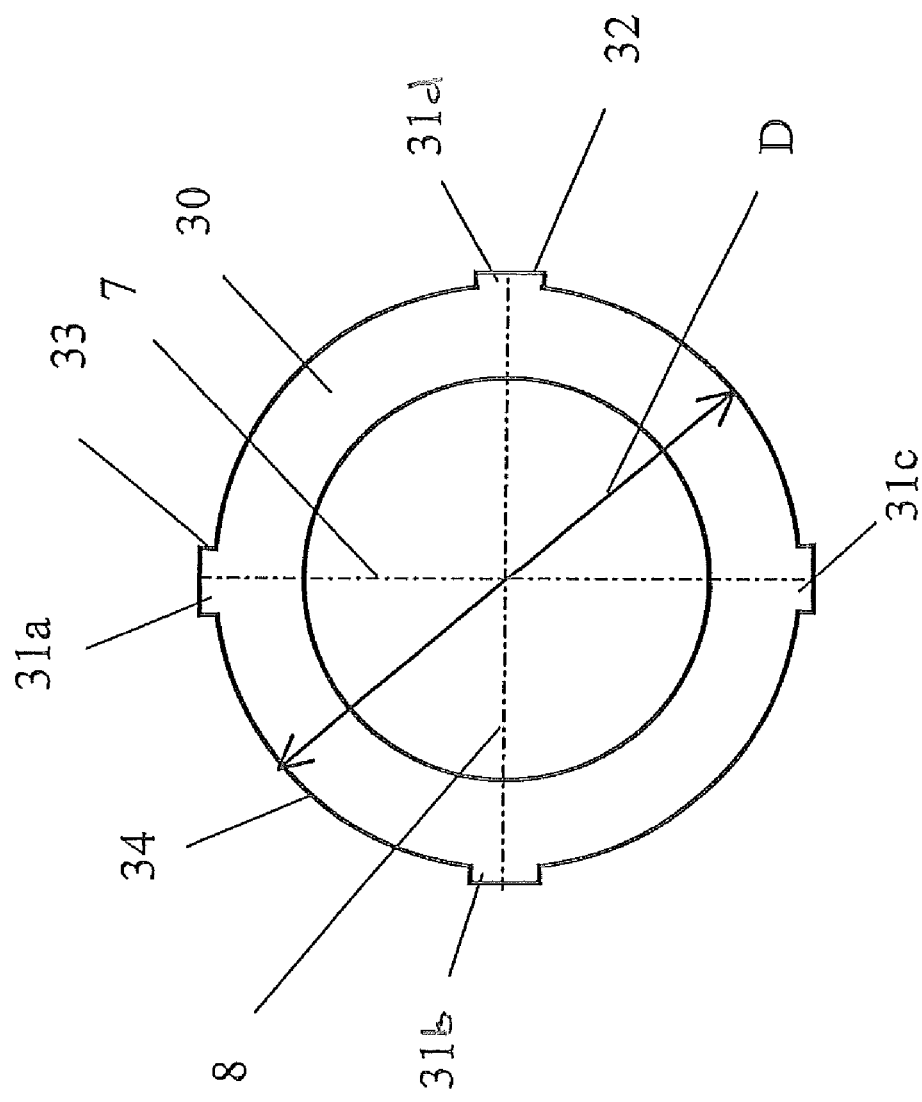

One exemplary embodiment of the invention is illustrated in FIG. 6. FIG. 6 illustrates a thrust ring that forms the end plate of the stator. There are four necks of material 31a, 31b, 31c, 31d machined on the thrust ring 30. The necks are of substantially equal size and shape. The necks 31a-31d are located symmetrically to each other on the outer circumference 34 of the thrust ring. The necks 31a-31d are located symmetrically in relation to the vertical symmetry axis 7 perpendicular to the axial direction. The necks 31a-31d are also located symmetrically in relation to the horizontal symmetry axis 8 perpendicular to the axial direction.

The side length or protrusion 33 of the neck is very small compared with the diameter D of the thrust ring. The width of the base 32 of the neck is small compared with the diameter D of the thrust ring.

Figure 7:
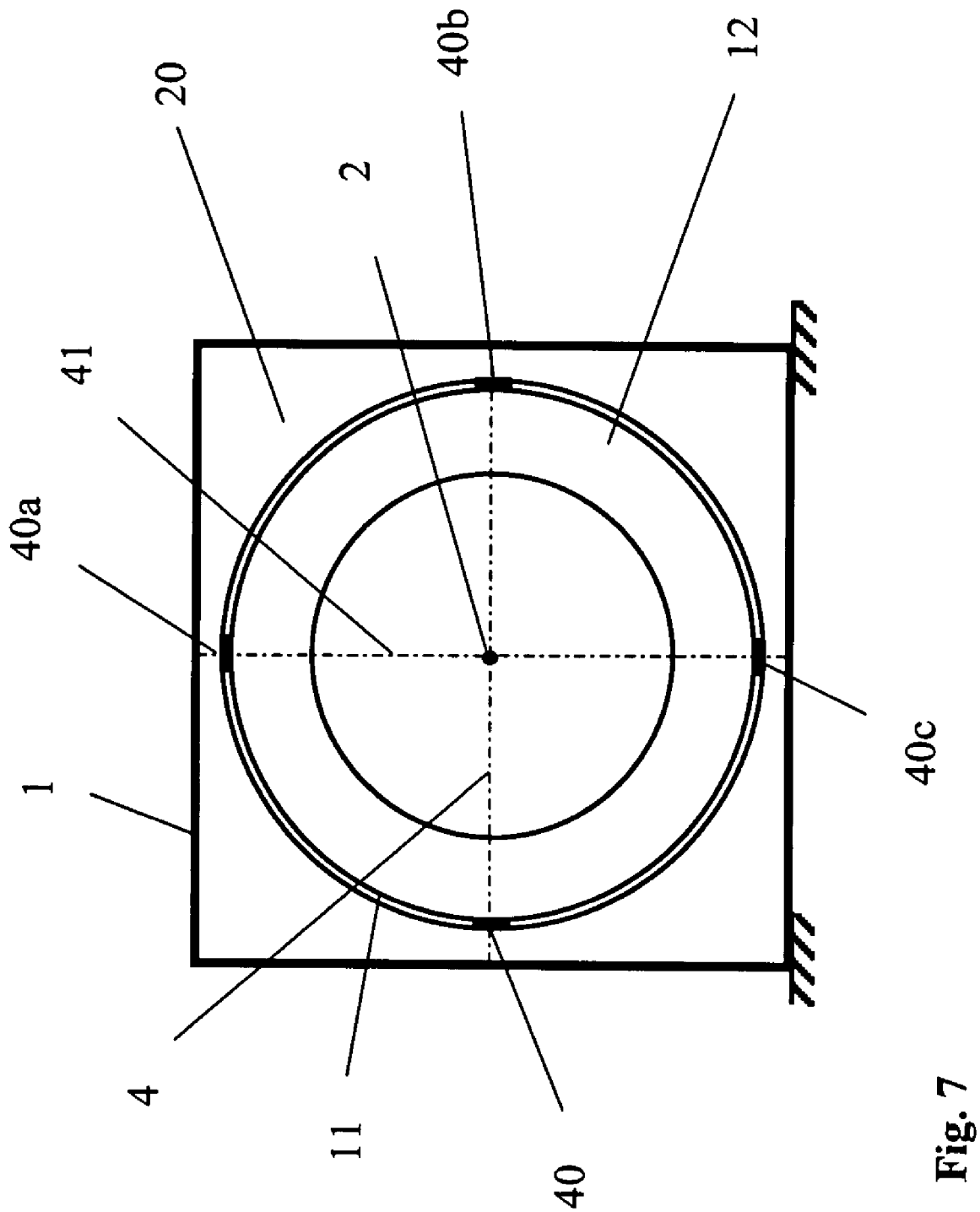

A further exemplary embodiment of the invention is illustrated in FIG. 7. In FIG. 7 there are four necks 40a, 40b, 40c, 40d at the stator end 12. The necks 40a-d are of substantially equal size and shape. The necks 40a-d are wedge-shaped elements attached to the intermediate wall 20. The necks 40a-d are located at the intersection point of the vertical axis 41 perpendicular to the axial direction 2, the outer surface 11 of the stator and the end 12 of the stator, as well as at the intersection point of the horizontal axis 42 perpendicular to the axial direction 2, the outer surface 11 of the stator and the end 12 of the stator.

The dimensions of the necks illustrated in FIGS. 4 to 7 are not to scale with the rest of the illustrations but are emphasised for the sake of clarity.

In the above, the invention has been described with the help of certain embodiments. However, the description should not be considered as limiting the scope of patent protection; the embodiments of the invention may vary within the scope of the following claims.

List of Reference Numbers:

1 frame; 2 axial line; 3 side wall of frame; 4 bottom plate of frame; 5 top plate of frame; 6 base; 7 vertical symmetry axis; 8 horizontal symmetry axis; 10 stator; 11 outer surface of stator; 12 end of stator; 20 intermediate wall; 21 a, 21 b, 21 c, 21d, 21e, 21f neck; 22 base of neck; 23 side of neck; 24 opening; 25a, 25b, 25c, 25d side of intermediate wall; 30 thrust ring; 31a, 31b, 31c, 31d neck; 32 base of neck; 33 side of neck; 34 outer circumference of thrust ring; 40a, 40b, 40c, 40d neck; 41 vertical axis; 42 horizontal axis.

D diameter of thrust ring; L diameter of opening in intermediate wall.

The invention claimed is:

1. An electrical machine comprising: a frame; and a stator, said stator including a first and second end in an axial direction and an end plate formed at each of the first and second ends and said stator being supported on the frame of the electrical machine, wherein the stator is supported by necks of material formed on an outer surface of each end plate at both ends of the stator, said necks directly attached to the frame, wherein the number of necks at both ends of the stator is even, in that the stator has a vertical symmetry axis perpendicular to the axial direction and a horizontal symmetry axis perpendicular to the axial direction, and the necks are located symmetrically in relation to at least one of the symmetry axes.

2. An electrical machine according to claim 1, wherein the necks are located substantially at an intersection point of a vertical axis perpendicular to the axial direction, the outer surface of the stator and the ends of the stator, or at an intersection point of the horizontal axis perpendicular to the axial direction, the outer surface of the stator and the ends of the stator.

3. An electrical machine according to claim 1, wherein the necks are located substantially at an intersection point of the vertical axis perpendicular to the axial direction, the outer surface of the stator and the ends of the stator, as well as at an intersection point of the horizontal axis perpendicular to the axial direction, the outer surface of the stator and the ends of the stator.

4. An electrical machine according to claim 1, wherein the necks are substantially narrow.

5. An electrical machine according to claim 1, wherein the necks are substantially short in the axial direction.

6. The electrical machine according to claim 1, wherein the necks of material are located symmetrically in both of the symmetry axes.

7. An electrical machine comprising: a frame, including intermediate walls; and a stator, said stator including an outer surface and a first and second end in an axial direction and said stator being supported on the frame of the electrical machine, wherein necks of material are formed on the intermediate wall and corresponding to the outer surface of the stator at both ends and are directly attached to the outer surface, wherein the number of necks at both ends of the stator is even, in that the stator has a vertical symmetry axis perpendicular to the axial direction and a horizontal symmetry axis perpendicular to the axial direction, and in that the necks are located symmetrically in relation to at least one of the symmetry axes.

8. An electrical machine according to claim 7, wherein the necks are located substantially at an intersection point of a vertical axis perpendicular to the axial direction, the outer surface of the stator and the ends of the stator, or at an intersection point of the horizontal axis perpendicular to the axial direction, the outer surface of the stator and the ends of the stator.

9. An electrical machine according to claim 7, wherein the necks are located substantially at an intersection point of the vertical axis perpendicular to the axial direction, the outer surface of the stator and the ends of the stator, as well as at an intersection point of the horizontal axis perpendicular to the axial direction, the outer surface of the stator and the ends of the stator.

10. An electrical machine according to claim 7, wherein the necks are substantially narrow.

11. An electrical machine according to claim 7, wherein the necks are substantially short in the axial direction.

12. The electrical machine according to claim 7, wherein the necks of material are located symmetrically in both of the symmetry axes.

* * * * *